United States Patent [19]

Miller

[11] 4,383,614
[45] May 17, 1983

[54] CLIP FOR RELEASABLY LOCKING RAILS TO SUPPORTS

[75] Inventor: Daniel A. Miller, Lebanon, Ohio

[73] Assignee: Nestier Corporation, Cincinnati, Ohio

[21] Appl. No.: 189,194

[22] Filed: Sep. 22, 1980

[51] Int. Cl.³ .............................................. A47F 5/00
[52] U.S. Cl. ................. 211/49 D; 211/151; 211/183
[58] Field of Search ............... 211/134, 187, 490, 151, 211/186, 182, 153, 183, 192

[56] References Cited

U.S. PATENT DOCUMENTS

| | | | |
|---|---|---|---|
| 1,563,116 | 11/1925 | Tinsley | 211/151 |
| 2,786,578 | 3/1957 | Degraaf et al. | 211/151 X |
| 3,900,112 | 8/1975 | Azzi et al. | 211/151 X |
| 4,168,780 | 9/1979 | Panott | 211/151 |

FOREIGN PATENT DOCUMENTS 620336  9/1963  Canada ................................ 211/490

Primary Examiner—Francis K. Zugel
Assistant Examiner—Robert W. Gibson, Jr.
Attorney, Agent, or Firm—Thomas E. Beall, Jr.

[57] ABSTRACT

A track member having a bottom end portion resting on an upper surface of a support flange has a clip member slidably attached thereto for movement between a locking position and a releasing position for respectively preventing or permitting upward movement of the rail end portion with respect to the support flange. In the locking position of the clip member, a projecting tongue engages the bottom surface of the support flange opposite from the upper surface area on which the track member bottom end portion is supported. In the releasing position of the clip member, the tongue is clear of the support flange.

16 Claims, 6 Drawing Figures

CLIP FOR RELEASABLY LOCKING RAILS TO SUPPORTS

BACKGROUND OF THE INVENTION

This application relates to the art of clips and, more particularly, to clips for releasably securing two members together. The invention is particularly applicable for use in securing track members to shelf frames in gravity flow racks of merchandise order picking systems. However, it will be appreciated that the invention has broader applications and may be used for other purposes.

Gravity flow racks for merchandise order picking systems include downwardly inclined vertical shelves formed by rectangular frames having track members extending between front and rear frame rails. The track members are adjustable along the rails for accommodating merchandise cartons of different sizes. The track members are subject to upward displacement when placing cartons on the racks and removing cartons therefrom. It would be desirable to have a simple and inexpensive manner of locking the track members to the rails against upward displacement.

SUMMARY OF THE INVENTION

A shelf for a gravity flow rack of the type described has a clip member slidably secured to the track members for cooperation with a rail support flange to prevent upward displacement of the track members.

In one arrangement, the opposite bottom end portions of a track member are supported on the upper surface of a support flange having a predetermined thickness. A clip member slidably secured to a track member has a tongue extending outwardly therefrom with a tongue upper surface spaced from the track member bottom surface a distance less than the predetermined thickness of the support flange. The tongue is slidable along the track member to a position in which the upper surface of the tongue engages the underside of the support flange opposite from the upper flange surface area on which a bottom end portion of the track member is supported. The clip member is slidable to a position in which the tongue is clear of the support flange for providing free upward movement of the track member relative to the support flange for repositioning of the track member.

The clip member is constructed in one-piece of synthetic plastic material and includes a generally flat clip body having outwardly opening opposite longitudinal grooves therein. The grooves have upper and lower groove side surfaces, and tongue projects longitudinally outwardly from the clip body. The tongue has an upper surface spaced below the groove lower side surfaces.

The tongue has an outer tongue end and is upwardly beveled from the outer end to the tongue upper surface to facilitate movement of the tongue past the edge of the support flange.

Resilient lips extend upwardly and inwardly toward one another from the clip body outwardly of the grooves.

Tabs extend outwardly from the clip body generally perpendicular to the tongue for engagement by a person's fingers to slide the clip along a track member.

A track member has a generally inverted U-shaped cross-sectional configuration including a flat top web having straight legs projecting downwardly perpendicular thereto. The legs have inwardly bent runners which are received in the clip grooves for slidably holding the clip to the track member. The resilient lips on the clip member engage the outer surfaces of the legs for frictionally holding the clip member in any desired position.

It is a principal object of the present invention to provide an improved clip member for releasably locking a member to a support.

It is also an object of the invention to provide an improved shelf having an improved arrangement for releasably attaching track members to shelf frame rails.

DESCRIPTION OF A PREFERRED EMBODIMENT

Figure 1:
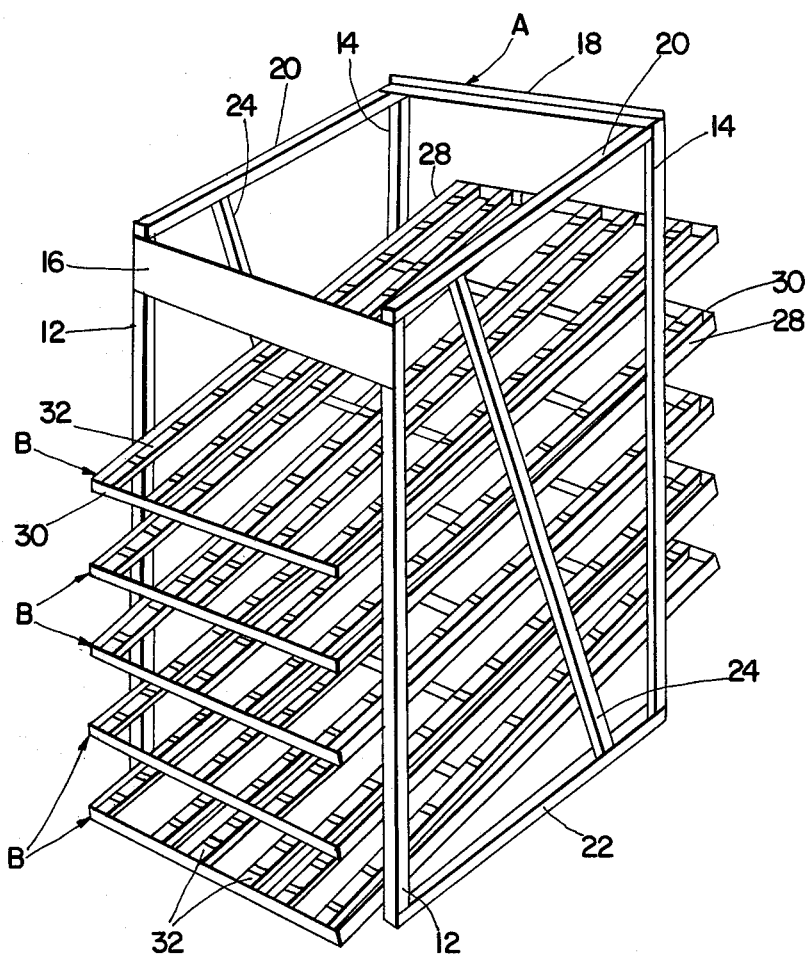
FIG. 1 is a diagrammatic perspective illustration of a gravity flow rack used in a merchandise order picking system.

With reference to the drawing, FIG. 1 shows a gravity flow rack for an order picking system including a generally cubical support frame A formed by vertical front columns 12, upper front and rear connecting members 16 and 18, upper side connecting members 20, lower side connecting members 22 and diagonal brace members 24. A plurality of vertically-spaced shelves B are supported on columns 12, 14 and are downwardly inclined in a direction from rear columns 14 toward front columns 12.

Each shelf B includes parallel opposite side frame members 28, and parallel front and rear frame rails 30 of identical construction. Elongated track members 32 extend between rails 30 for slidably supporting merchandise cartons which are placed on the track members adjacent rear columns 14 and slide along the track members toward front columns 12.

Each front and rear rail 30 includes a bottom support flange 36 and an upper flange having a plurality of uniformly spaced teeth 38 between which uniformly spaced notches 40 are defined. The terminal ends of teeth 38 are spaced above and along bottom support flange 36 from bottom flange terminal edge 42.

The track members include roller track members 32a and guide track members 32b. Roller track member 32a is of generally inverted U-shaped cross-sectional configuration including a flat top web 46 having opposite parallel straight legs 48 extending downwardly perpendicular thereto. The lower ends of legs 48 are inwardly bent toward one another to provide runners 50 between which a longitudinal slot is defined. Top web 46 has a plurality of longitudinally-spaced rectangular openings 52 therein and rollers 54 are suitably rotatably mounted to legs 48. Rollers 54 project upwardly through rectangular openings 52 for rollably supporting merchandise cartons positioned on roller track members 32a.

Figure 2:
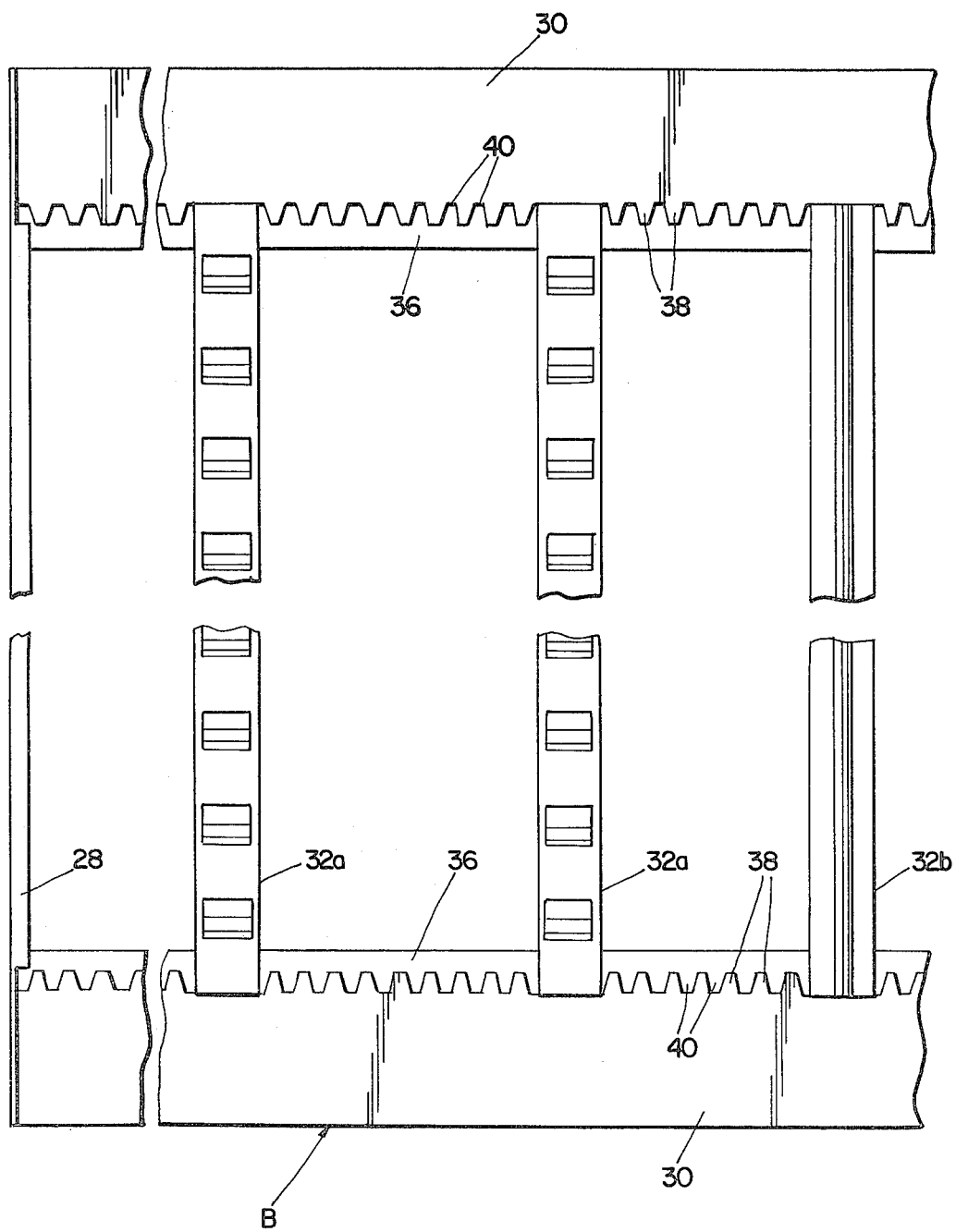
FIG. 2 is a partial top plan view of a shelf used in the rack of FIG. 1.
Figure 3:
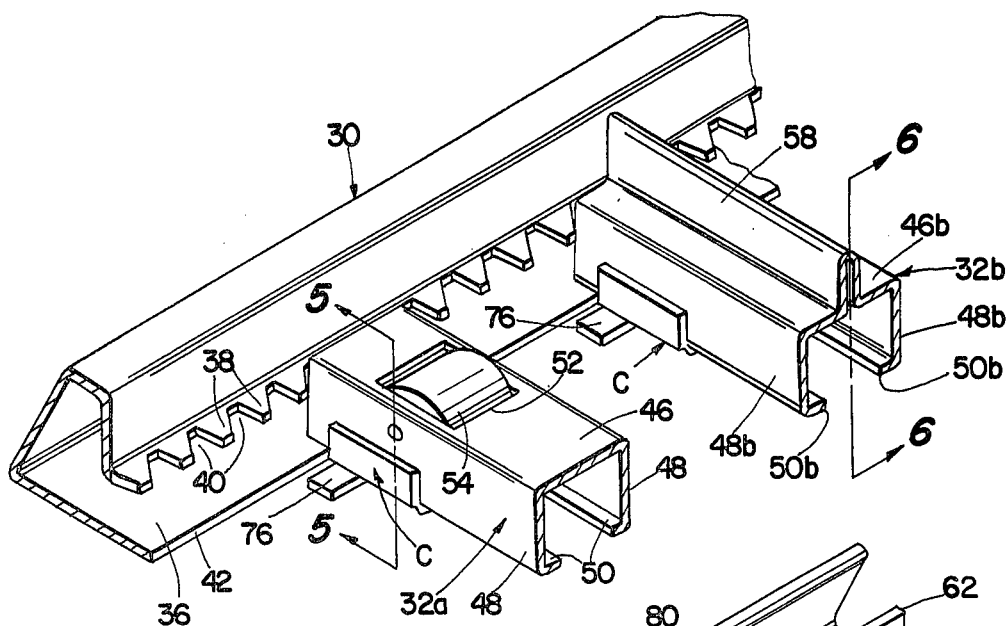
FIG. 3 is a partial perspective illustration showing end portions of track members supported on a frame rail.
Figure 4:
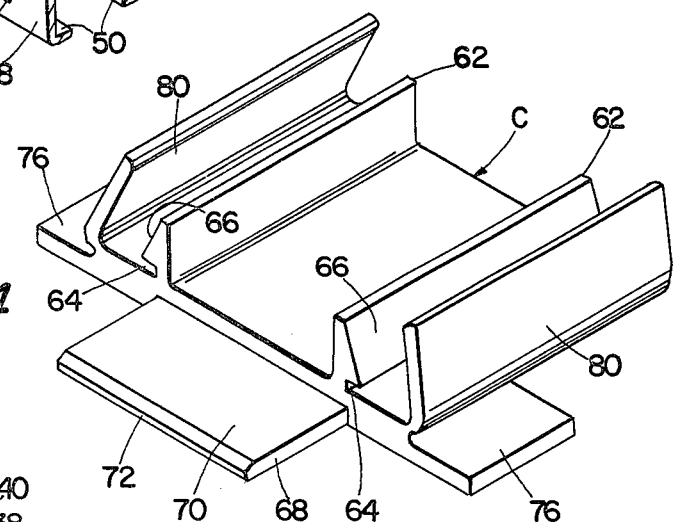
FIG. 4 is a perspective illustration of the clip member of the present application.
Figure 5:
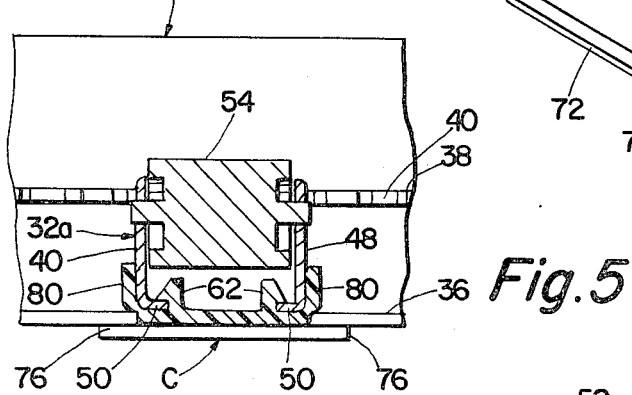
FIG. 5 is a partial cross-sectional elevational view taken generally on line 5—5 of FIG. 3.

Guide track member 32b is of generally the same size as roller track member 32a and corresponding parts of guide track member 32b are identified by the same numerals followed by the letter "b". Instead of having rectangular openings and rollers, guide track member 32b has an upper web 46b which is centrally reversely folded to provide a longitudinal upwardly extending guide projection 58. Merchandise cartons positioned on a plurality of roller track members 32a have the opposite carton sides guided between spaced guide projections 58 on guide track members 32b, or between a guide projection 58 and one of side frame members 28 of FIG. 2.

The vertical ends of legs 48, 48b on track members 32a, 32b are receivable in notches 40 with the bottom end portions of the track members supported on the upper surface of support flange 36. Track members 32a, 32b may be vertically lifted and positioned in different notches for varying the spacing of the track members to accommodate merchandise cartons of different sizes.

Each track member has a clip member C slidably attached thereto adjacent at least one end portion thereof for releasably locking that one end portion to support flange 36 against upward displacement therefrom. Clip member C is constructed in one-piece of synthetic plastic material and includes a generally flat clip body 60 having a pair of parallel spaced-apart longitudinally extending projections 62 in which outwardly facing opposite longitudinal grooves 64 are defined. Grooves 64 have upper and lower groove side surfaces and groove bottom surfaces. Projections 62 have cam surfaces 66 which slope downwardly and outwardly from the upper edges of projections 62 toward grooves 64.

An integral substantially flat tongue 68 projects outwardly from one end of clip body 60 in the same longitudinal direction along which grooves 64 extend. Tongue 68 has a substantially flat upper surface 70 and a beveled or sloping surface 72 which slopes upwardly from the outer terminal end of tongue 68 to intersection with tongue upper surface 70. Tongue upper surface 70 is spaced below the groove lower side surfaces. With support flange 36 having a predetermined thickness between its upper supporting surface and its opposite lower surface, tongue upper surface 70 is preferably spaced below the groove lower side surfaces a distance slightly less than that predetermined thickness.

Opposite tabs 76 extend outwardly from clip body 60 in directions generally perpendicular to the extension direction of tongue 68. Opposite resilient lips 80 extend upwardly and inwardly toward one another from clip body 60 outwardly of grooves 64. The distance from the bottom of a groove 64 to a perpendicular line tangent to the upper edge of a lip 80 is substantially less than the distance from the terminal edge of a runner 50 to the outer surface of a leg 48.

A clip may be installed on a track member 32a, 32b by sliding same thereon from an end of a track member or the clip may be snapped into position by engaging the edges of runners 50 with projection cam surfaces 66 and applying pressure on the clip to deform projections 62 inwardly until runners 50 snap into grooves 64. The plastic material of clip C is sufficiently deformable for providing installation. Clip lips 80 are resiliently deformed when the clip is installed so that they resiliently hug the outer surfaces of legs 48, 48b to provide frictional resistance against unintentional movement of clip member C along a track member.

Figure 6:
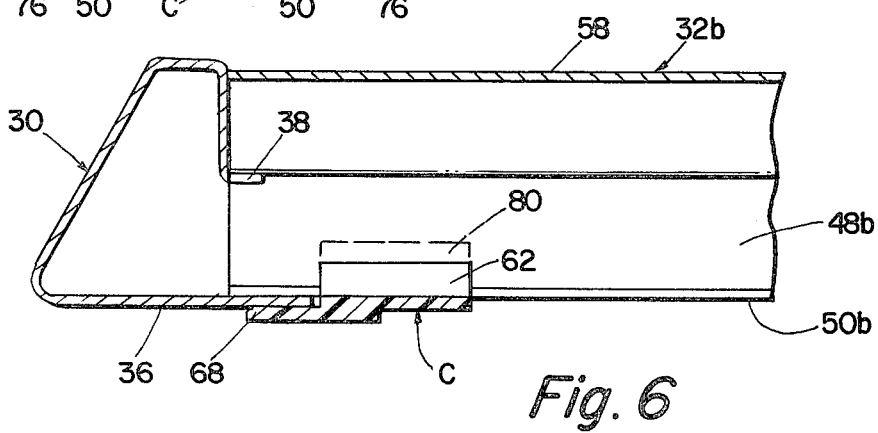
FIG. 6 is a partial cross-sectional elevational view taken generally on line 6—6 of FIG. 3.

With clips C installed adjacent at least one end portion of the track members, the track members are positioned with the vertical end edges of legs 48 received in notches 40 and with the bottom end portion of the track members resting on the upper support surface of support flange 36. A person may then engage clip tabs 76 with his fingers for sliding the clip members toward bottom flange 36. Front bevel 72 on tongue 68 allows tongue 68 to move freely past flange edge 42. The spacing between the bottom surface of a track member and the upper surface 70 of tongue 68 is slightly less than the thickness of flange 36 so that tongue 68 is slightly stressed or bent when clip member C is in its locking position shown in FIG. 6. Tongue 68 is engaging the undersurface of support flange 36 opposite from the upper flange area on which the bottom end portion of a track member is supported. In order to release the track members for vertical movement and repositioning, a person simply engages tabs 76 with his fingers and slides the clip members away from support flange 36 until tongues 68 are clear of support flange 36.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A shelf for an order picking rack comprising: a generally rectangular frame including opposite side frame members and front and rear rails, said rails having flanges extending toward one another inwardly of said frame, an elongated track member having opposite bottom end portions supported on said flanges, a clip member slidably mounted on said track member adjacent at least one end thereof for sliding movement between locking and releasing positions, said clip member having a tongue projecting therefrom, said clip member in said locking position having said tongue located on the opposite side of one said flange from one said bottom end portion for preventing upward displacement of said one end portion, and said clip member in said releasing position thereof having said tongue located in spaced relationship to said flange along said track member for allowing free upward movement of said one end portion from said one flange.

2. The shelf of claim 1 wherein said flange has a predetermined thickness, said track member having a track bottom surface and said tongue having an upper surface spaced from said track bottom surface a distance less than said predetermined thickness of said flange.

3. The shelf of claim 2 wherein said tongue has a beveled front end portion which slopes upward to intersection with said tongue upper surface from a tongue front edge which is spaced from said track bottom surface a distance substantially greater than said predetermined thickness of said flange.

4. The shelf of claim 1 wherein said track member is of inverted generally U-shaped cross-sectional configuration including a top web and opposite legs depending therefrom, said legs having inwardly turned runners extending toward one another, said clip member having mounting means for slidably mounting same on said runners.

5. The shelf of claim 4 wherein said mounting means includes outwardly facing opposite grooves receiving said runners.

6. The shelf of claim 5 including lips on said clip member resiliently gripping the outer surfaces of said legs.

7. The shelf of claim 6 including opposite tabs extending outwardly from said clip beyond said legs of said track member for engagement by a person's fingers to slide said clip along said runners.

8. The shelf of claim 1 wherein said track member is of inverted generally u-shaped cross sectional configuration including a top web and opposite legs depending therefrom, said legs having inwardly turned runners extending toward one another, said clip member having mounting means for slidably mounting same on said runners, and opposite tabs extending outwardly from said clip beyond said legs of said track member for engagement by a persons fingers to slide said clip along said runners.

9. A one-piece plastic clip member for releasably locking an end of a track member on a support flange comprising: a generally flat clip body having outwardly opening opposite longitudinal grooves therein, said grooves having groove upper and lower side surfaces, a generally flat tongue projecting outwardly from one end of said body in a direction generally parallel to said grooves, said tongue having a tongue upper surface spaced below said groove lower side surfaces.

10. The clip of claim 9 wherein said tongue has a tongue terminal end and an upwardly sloping surface which slopes upwardly from said tongue terminal end in a direction back toward said clip body to intersection with said tongue upper surface.

11. The clip of claim 9 including opposite lips on said body outwardly of said grooves extending upwardly and toward one another.

12. The clip of claim 9 including opposite tabs extending outwardly from said body in a direction generally perpendicular to said tongue.

13. The clip of claim 9 including opposite lips on said body outwardly of said grooves extending upwardly and toward one another, and opposite tabs extending outwardly from said body in a direction generally perpendicular to said tongue.

14. The clip of claim 9 wherein said tongue has a tongue terminal end and an upwardly sloping surface which slopes upwardly from said tongue terminal and in a direction back toward said clip body to intersection with said tongue upper surface and including opposite lips on said body outwardly of said grooves extending upwardly and toward one another, and opposite tabs extending outwardly from said body in a direction generally perpendicular to said tongue.

15. A shelf for a gravity flow rack or the like comprising: a generally rectangular frame including opposite side frame members and front and rear rails, said rails having bottom support flanges and upper flanges with notches therealong, a track member support on said support flanges and having end edges received in certain of said notches for preventing lateral displacement of said track member, and means on at least one end of said track member cooperating with at least one of said bottom support flanges for releasably locking said one end to said bottom support flange against vertical displacement therefrom.

16. The shelf of claim 15 wherein said cooperating means is a slidable clip, slidably mounted on said track member and engaging said bottom support flange when in the locked position.

* * * * *